United States Patent
Kragl

(10) Patent No.: US 7,206,493 B2
(45) Date of Patent: Apr. 17, 2007

(54) METHOD AND APPARATUS FOR CREATING CIRCUMFERENTIAL FLAT SURFACES ON ROUND CROSS SECTION POLYMER OPTICAL FIBER

(75) Inventor: Hans Kragl, Diekholzen (DE)

(73) Assignee: Diemount GmbH, Wernigerode (DE)

( * ) Notice: Subject to any disclaimer, the term of this patent is extended or adjusted under 35 U.S.C. 154(b) by 0 days.

(21) Appl. No.: 11/435,354

(22) Filed: May 16, 2006

(65) Prior Publication Data

US 2006/0204194 A1    Sep. 14, 2006

Related U.S. Application Data

(63) Continuation of application No. PCT/EP2004/012928, filed on Nov. 15, 2004.

(30) Foreign Application Priority Data

Nov. 19, 2003    (DE) ................ 103 54 008

(51) Int. Cl.
*G02B 6/10* (2006.01)
(52) U.S. Cl. .................... 385/146; 385/43; 385/85
(58) Field of Classification Search ............ 350/96.15; 451/364; 385/85; 83/881; 225/96.5, 2, 225/101; 82/168, 169
See application file for complete search history.

(56) References Cited

U.S. PATENT DOCUMENTS 4,720,161 A * 1/1988 Malavieille ................ 385/43
6,138,476 A * 10/2000 Watanabe et al. ........... 65/102
6,473,555 B1 * 10/2002 Kragl et al. ................ 385/146
6,636,672 B1 * 10/2003 Blyler et al. ................ 385/50
6,869,347 B2 * 3/2005 Koinkar et al. ............. 451/364
2002/0181873 A1 * 12/2002 Anderegg et al. .......... 385/39

FOREIGN PATENT DOCUMENTS

| DE | 198 61 139 C2 | 3/2001 |
| EP | 0 619 506 A | 10/1994 |
| EP | 0619506 A2 * | 10/1994 |

OTHER PUBLICATIONS

W.Daum, J.Krauser, P.Zamzow, O.Ziemann: POF Optische Polymerfasern für Datenkommunikation, Springer Verlag 2001, p. 150.
International Search Report for PCT Publication No. WO 2005/050272 A3, Dated Dec. 8, 2005.

* cited by examiner

*Primary Examiner*—Frank G. Font
*Assistant Examiner*—Guy G. Anderson
(74) *Attorney, Agent, or Firm*—Jansson Shupe & Munger Ltd.

(57) ABSTRACT

For creating flat surfaces along the circumference of a polymer optical fiber of a round cross section by machining, the polymer optical fiber is wound onto a mandrel in a plurality of windings, the mandrel having a generally non-circular cross section with at least one projecting sector in which the radius is constant or, starting from an apex of the largest radius, in which the radius linearly decreases on both sides with an increasing angular distance to the apex, the machining including using a cutting chisel of a high quality for turning-off the polymer optical fiber in the projecting sector of the mandrel. Subsequently, the polymer optical fiber is cut to several pieces that can be used for the manufacture of optical splitters.

11 Claims, 3 Drawing Sheets

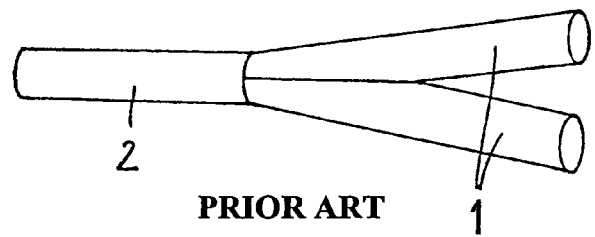
FIG. 1
PRIOR ART
FIG. 2a
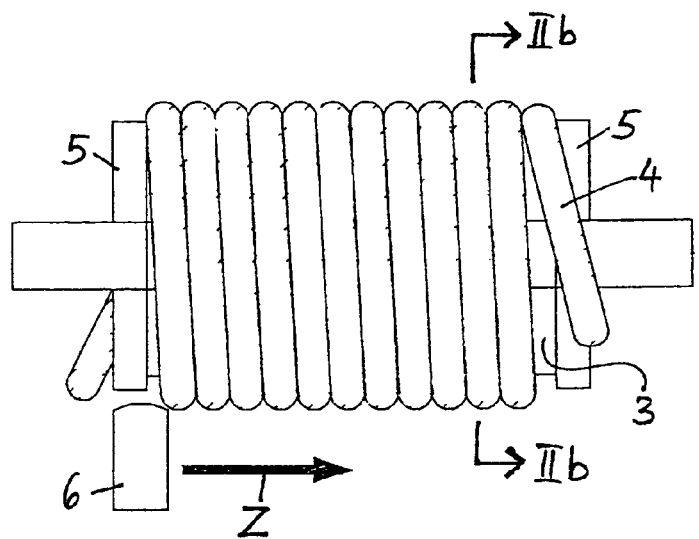
FIG. 2b
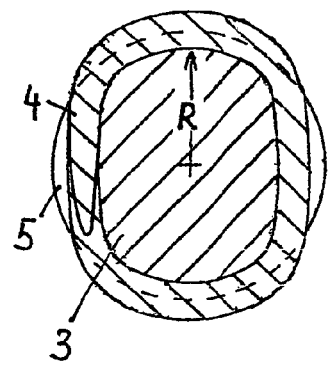
FIG. 3a
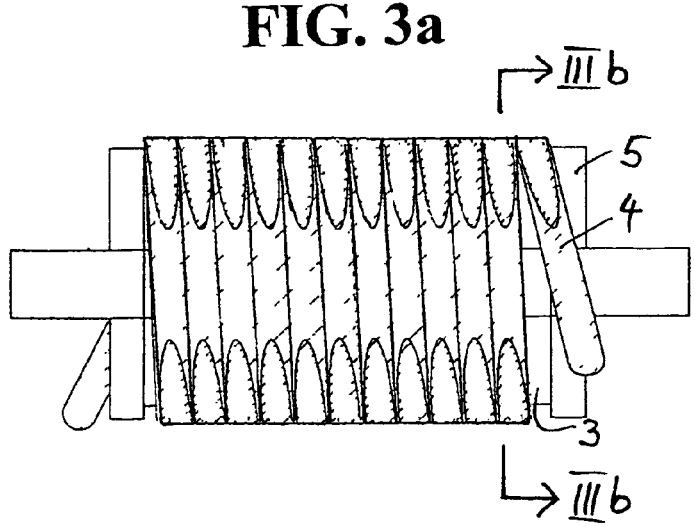
FIG. 3b
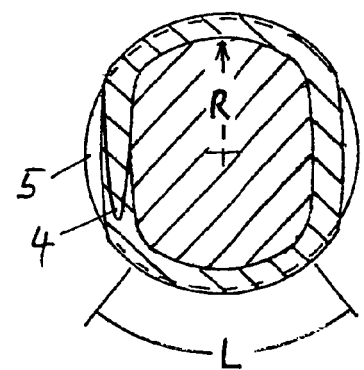

METHOD AND APPARATUS FOR CREATING CIRCUMFERENTIAL FLAT SURFACES ON ROUND CROSS SECTION POLYMER OPTICAL FIBER

CROSS REFERENCE TO RELATED APPLICATION

This application is a continuation of PCT application PCT/EP2004/012928, filed Nov. 15, 2004 by inventor Hans Kragl, and claims priority to German application DE 103 54 008.3, filed Nov. 19, 2003.

FIELD OF THE INVENTION

The present invention generally refers to the manufacture of optical couplers for polymer optical fiber (hereinafter referred to as "POF") and particularly to an apparatus for and method of creating flat surfaces on the circumference of such fiber having a round cross section.

BACKGROUND OF THE INVENTION

Passive couplers for the polymer optical fiber may be used, for example, for transferring the data stream carried by optical signals from one POF to two or more POFs. Applications thereof are optical communication systems having a distribution function, measuring systems in which a permanent control of the optical power during operation must take place, or optical, bi-directionally operating communication systems, in which both incoming and outgoing signals are transmitted on a single POF (see in this respect W. Daum, J. Krauser, P. Zamzow, O. Ziemann: "POF Optische Polymerfasern für Datenkommunikation", Springer Verlag 2001, pg. 150). In these bi-directional systems, the transmitter and the receiver of a network node are connected to the communication fiber via an optical splitter.

During the past 20 years or so, a large number of different technologies for the manufacture of optical splitters have been presented. Fiber-optical coupling elements, integrated optical coupling elements, as well as structures with injection-molded coupling elements are known. The so-called polished couplers are of special interest because of their structural simplicity and high optical quality (see the above-mentioned book of W. Daum et al.).

As implied by the name "polished coupler," for the manufacture of a polished coupler, the end section of a POF may be planarly, high-quality ground in oblique direction to half of the diameter of the POF and subsequently may be joined to an end section of a second POF processed in the same way, so that the two semicircular flat end faces of the ground POFs resulting from the grinding processes may be combined to form a full circular end face, which after planar grinding of the flat surface exactly fits onto the flat end face of a third, exiting or incoming POF. The flat end faces abutting each other and the obliquely extending, polished surfaces usually are each adhered to one another by means of a transparent adhesive. In this method it is advantageous to create the surface of the obliquely extending polished portion, of each of the first mentioned POFs, which extends essentially in the axial direction of the third POF, in optical quality, i.e., with generally highly gloss finish. The light guided within the POF must not be scattered at this surface. The smallest roughness leads to stray light and thus to a quality loss of the optical splitter.

On the basis of the polished coupler, couplers with an excess loss of less than 1 dB can be manufactured. The excess loss describes the optical loss of the splitter exceeding the pure splitting loss. It is also not difficult to produce splitters having an almost arbitrary splitting ratio by asymmetrical high-quality grinding of the two or more POFs.

Up to now a series production of these splitters could not be established, since the polished splitters or couplers, as their name already implies, typically must be manufactured by wet grinding on a water-rinsed polishing machine to obtain an optical high-quality surface. In an example of such a process, the POFs are first of all clamped into a polishing holder, this holder is then manually set onto the polishing machine, and subsequently the POF is first of all processed by coarse polishing paper, later with finer and finer polishing paper to its final dimension. Each change of the polishing paper must be made manually. The polishing paper has a limited service life and is also relatively expensive so that it contributes to a significant part of the overall costs in mass production.

Tests to substitute the above-mentioned wet polishing process with different machining methods usually fail because the required precision cannot be attained and the surface quality is insufficient as long as tools of tool steel or of hard metal are used.

However, it is known from industrial engineering of optical elements such as mirrors of non-iron materials or plastic lenses, that when using diamond cutters and diamond cutting chisels, shining optical surfaces can be created that do not have to be polished in addition to the cutting. It is also known that by the use of a very fast rotating diamond cutter, the end face of a POF can be worked such that a shining surface is created. It is also known from U.S. Pat. No. 6,473,555 to vary the cross-section of a POF by heating same and by pressing it into a mold of the desired cross section. However, this method is not suitable for removing part of the cross section of a POF which in the remainder shall remain unchanged.

To address such problems and others, it is an object of the invention to provide a method and a device whereby polymer optical fibers can be processed economically in large numbers and at high quality in a manner so that they can subsequently be mounted to form low-loss couplers or splitters.

SUMMARY OF THE INVENTION

In one aspect of the invention, a method of creating flat surfaces at the circumference of polymer optical fiber with a round cross section includes machining, in which the polymer optical fiber is at first wound in a plurality of windings onto a mandrel, which has an essentially non-circular cross section with at least one radially projecting sector in which its radius is constant or starting from an apex of the largest radius linearly decreases on both sides with an increasing circumferential angular distance to said apex, and the polymer optical fiber is then turned-off, by a cutting chisel of high quality, in the projecting sector of the mandrel.

Preferably, a diamond cutting chisel is used for the turning process, since it creates polished surfaces that do not require any after-treatment. It is preferable if the polymer optical fiber is turned-off to a semi-circular cross section, and also preferable if the polymer optical fiber is held under tensile stress during the turning process.

During turning, cutting speeds of approximately 10 m/s are advantageous in practice. Higher cutting speeds are possible, but a limiting factor is a possible unbalance of the mandrel with the polymer optical fiber wound thereon, so that in case of higher speeds vibrations may be generated, which provide imprecise working results. However, this problem can be coped with by a higher mounting precision. The linear movement speed of the cutting tool used for turning may be larger than 2 mm per revolution. By one cutting process, for example, approximately 20 to 30 µm of the fiber material can be removed. The cutting tool in such a case must therefore pass the workpiece several times if up to half of the diameter of the polymer optical fiber shall be removed. To obtain a high quality of the turned surface, the present inventor found it to be favorable if, during the last cutting process, only approximately 10 µm of the material of the polymer optical fiber is removed.

In one embodiment, it is advantageous for the polished surfaces of the POFs to be joined to be coated in vacuum with an approximately 100 nm thick layer sequence of $SiO_2$, Ag, and $SiO_2$ before joining same. As a result, the cross-talk attenuation is increased quite considerably, namely up to 60 dB, without an excess loss being essentially aggravated thereby. Such a coating is preferably carried out at temperatures below 70° C. so that the POF is not damaged or even destroyed.

Instead of the use of $SiO_2$, a technique used in the manufacture of vehicle headlamp mirrors can also be applied for coating the POFs, in which polymer, Ag, and polymer are applied in this sequence onto a carrier, which in the instant case is the POF turned-off according to the method of the invention. An advantage is that for this purpose the long-used and well-proven coating methods can be used.

Tests with a coating of 100 nm HMDS, 100 nm Al, and 100 nm HMDS have shown that the couplers manufactured from POFs processed in this manner reveal almost the same quality as couplers whose POFs were provided with the above-mentioned layer sequence of $SiO_2$, Ag, and $SiO_2$. Compared to the latter the first mentioned ones have the advantage to be easier and more cost-effective in manufacture. HMDS is the abbreviation for hexamethyldisilane, which is predominantly used in semiconductor technology as an adhesive before applying a photo-resist onto a substrate. HMDS layers in connection with an Ag layer are also advantageous. The layer thicknesses are not restricted to the above-mentioned examples. HMDS furthermore has the property favorable for the invention that its refractive index is lower than that of the core material of the POF, which preferably consists of PMMA. This supports a total reflection on the interface between the POF and the HMDS layer. Furthermore, the HMDS tightly seals the embedded aluminum and thereby prevents corrosion of the aluminum. If silver is used instead of aluminum between the HMDS layers, the corrosion-protecting effect of the HMDS cover layer is even more meaningful.

According to another aspect of the invention, a device for creating flat surfaces at the circumference of polymer optical fiber of a round cross section by machining, includes a lathe with a work piece holder in the form of a mandrel, having an overall non-circular cross section with at least one projecting sector in which the radius is constant or starting from an apex of largest radius linearly decreases on both sides with increasing angular distance from said apex, and which is adapted to accommodate a plurality of windings of a polymer optical fiber, and a cutting chisel, which is movable in parallel to the rotary axis of the mandrel and which is kept at a distance from the rotary axis that is smaller than the largest radius of the mandrel enlarged by the diameter of the polymer optical fiber and that is larger than the largest diameter of the mandrel.

The cutting chisel is preferably a diamond cutting chisel. It is preferable if the mandrel has a helically-extending circumferential groove for accommodating the polymer optical fiber.

A polymer optical fiber for the use in a splitter and having an end section of a partially circular cross section limited by a flat surface is characterized according to the invention in that the length portion has a partially circular cross section with a constant cross section at least in a partial portion starting out from the end of the polymer optical fiber.

According to an aspect of the invention, a long POF is wound onto a mandrel of a non-circular cross section and is subsequently turned-off in a lathe by longitudinal turning by use of a cutting chisel of a high quality, particularly a diamond cutting chisel, in a manner where adjoining circumferential sections of the POF are removed, which alternate with sections that are not reached by the cutting chisel. The POF must then only be divided transversely in the center of the turned off portions and in the non-turned-off portions in order to obtain POF pieces that have planar surface sections on their circumference, respectively in the end faces of the POF pieces generated by transverse cutting, so that these end faces have the shape of a partial circular face only.

A splitter can then be composed by abutting two of such POF pieces whose end faces combine to form a circular face, onto a POF piece whose end has a matching circular cross section.

In the simplest case, the partial circular surfaces are semi-circular faces at the end of the POF pieces created by turning, so that two identical POF pieces can be assembled to become a splitter when abutted to a third POF piece whose connection end has a circular cross section.

In the case where the splitting of the light emerging from the third POF piece onto the adjoining POF pieces of the splitter shall be unequal, it may be provided that only a part of the material is removed from one of these POF pieces and respectively more material is removed from the other POF piece by a turning process, so that the end faces of the POF pieces processed in this manner combine with each other to form a circular surface again. It is clear that in the last mentioned case two different turning processes are to be carried out and the different POF pieces must be combined to one another as working results of these turning processes. Unequal splitting, i.e., nonsymmetrical splitters, are for example required in measuring technology if only a small part of the light is branched off for control purposes.

A manufacturing method according to the invention is advantageous compared to the prior art, at least because:

1. the surface of the respective faces processed by the cutting chisel are of high quality, i.e., they are optically smooth and shiny. Thus, a laborious polishing with wet grinding papers of different grains is not required;
2. the method can be adapted by enlarging the diameter and the length of the mandrel such that a very large number of splitters may be manufactured by one single longitudinal turning process. For example, by use of a mandrel of a diameter of 100 mm and a length of 300 mm, the components of 100 splitters can be manufactured in one processing step. If a large mandrel having a diameter of 400 mm and a length to 2 m is used, the manufacture of the components of 4000 splitters in one single longitudinal turning process becomes possible.

The size of the mandrel and thus the output of the parts per processing step are determined only by the size of the available lathe.

It is advantageous if the mandrel has a helically-extending circumferential groove into which the POF may be inserted. The guide of the POF on the mandrel is thereby improved. It is also advantageous if the POF is wound onto the mandrel at a small strain. This also improves the position stability. Moreover, the inner stress of the POF frozen in the longitudinal direction of the POF is compensated by the strain.

By a method according to the invention, POFs of all diameters can be processed irrespectively of whether blank POFs are concerned or whether they are provided with a sheath, e.g., of polyethylene.

According to an aspect of the invention, the cross section of the mandrel is substantially cylindrical and in the simplest case it has a circumferential portion radially offset with respect to a largest diameter, said circumferential portion being offset over a sufficiently large sector at least to such an extent that the sections of the POFs wound onto the mandrel and extending within this sector are not touched by the cutting chisel, when this chisel is partially removing the sections of the POF located on the largest diameter and in the proximity thereof during the turning process. By use of such a mandrel, a number of POF pieces having longitudinally extending flat faces can be produced, which is twice the number of windings of the POF on the mandrel. If the cross section of the mandrel has two of such radially offset circumferential portions, which are preferably arranged diametrically opposing each other and which are separated from one another by a largest circle diameter, twice as many POF pieces can accordingly be manufactured. Depending on the diameter of the mandrel, more than two of such radially offset circumferential portions with interposed largest circle diameters may be formed, which may result in the already mentioned number of 4000 pieces.

Such a largest circular diameter advantageously extends over a predetermined angular sector. Then, a length section per winding of the POF on the mandrel results in which the POF material is removed evenly by the cutting chisel. Two POF pieces of this kind cut from the long, processed POF and joined in parallel to one another at their turned-off length sections, together have a cylindrical shape, if the amount of the material removed in this portion fits with this aim, so that it is possible to insert these two POF pieces into a cylindrical sleeve in whose other end the third, unprocessed POF piece is inserted, such third POF piece being thereby coupled to the two processed POF pieces.

The end faces of abutting POFs may be polished by suitable, known methods.

It is also possible to design the plane faces, of the POF pieces created by turning-off, in a manner that they extend from the circumference inclined towards one of the free ends of the POF pieces. In this case, the mandrel must be dimensioned such that, starting out from a largest radius, the radius of the mandrel linearly decreases on both sides with an increasing angular deviation from the point of largest radius. Two POF pieces composed to form a pair then together form a circular face and cross section only on their end faces, which makes the support in a splitter housing more complicated compared to the above-mentioned solution using a cylindrical sleeve as a housing.

The invention will now be described in detail with reference to the drawing figures describing preferred embodiments.

BRIEF DESCRIPTION OF THE DRAWING FIGURES

FIG. 1 schematically shows a splitter according to the prior art.

FIG. 2a schematically shows in side view a mandrel with a POF wound thereon and a cutting chisel laterally positioned thereto.

FIG. 2b shows a radial section of the mandrel along line IIb—IIb in FIG. 2a with a POF wound thereon, prior to the turning process.

FIG. 3a shows in side view the mandrel according to FIG. 2a with a POF wound thereon, after the turning process.

FIG. 3b shows as a sectional view along line IIIb—IIIb in FIG. 3a, comparable to FIG. 2b, a view of the POF on the mandrel, after the turning process.

DETAILED DESCRIPTION OF PREFERRED EMBODIMENTS

Figure 4:
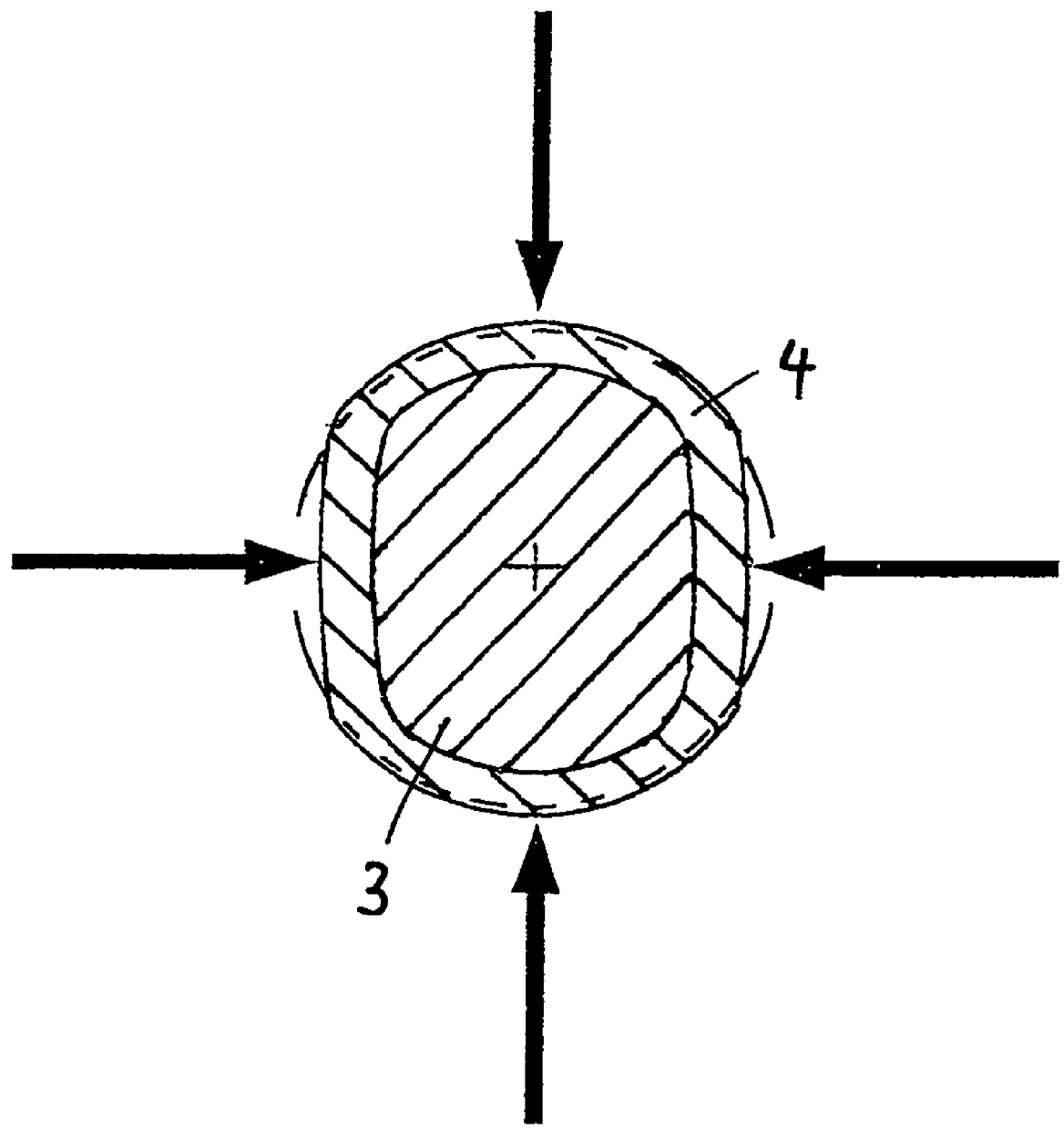
FIG. 4 shows a view comparable to FIG. 3b and used for explaining the positions at which the processed POF is to be separated to manufacture the POF pieces provided with faced surfaces and required for forming a splitter.

FIG. 1 shows the basic structure of a known polished coupler composed of three POFs, which are joined on their polished ends. This view can be derived from the above-mentioned publication of Daum et al. The polished coupler includes two POF pieces 1, whose circumferential surfaces are obliquely ground with high surface quality, i.e., polished in the area of a respective one of their ends, such ends abutting one another at their planar polished faces so that their axes extend at an acute angle with respect to one another. Furthermore, the polished coupler according to FIG. 1 comprises a third POF piece 2. The end faces of the obliquely polished POF pieces 1 together form a circular surface having a diameter that corresponds to the diameter of the third POF 2. All end faces are planar and polished to minimize stray loss.

A method according to the invention will now be explained with reference to the drawing figures.

According to FIG. 2a, a POF 4 is wound onto a mandrel 3 preferably under slight rotation of same. As is shown in FIG. 2b, the mandrel 3 has a non-circular cross section with two diametrically opposing sectors of a radius R and two interposed sections in which the circumference of the mandrel 3 is offset by reduction of its radius. The mandrel 3 is delimited at its end portions by cylindrical sections 5.

The mandrel 3 is held in a lathe (not shown in the drawing figures) and is set for rotation around an axis which coincides with the center of the radius R and the axis of the cylindrical sections 5. The lathe includes a cutting chisel 6, which is moved in the direction of an arrow Z, i.e., in parallel to the axis of rotation of the mandrel 3, to process the POF 4. The distance of the cutting chisel 6 with respect to the axis of the mandrel 3 is set such that the POF is within the movement path of the cutting edge of the cutting chisel 6 in those sectors of the mandrel 3 that are determined by the radius R.

According to FIG. 3a, material is removed from the POF 4 by the turning process in the sectors of the mandrel 3 that are determined by the radius R. The result of this processing step is shown in FIGS. 3a and 3b. In the present example, length portions L were created at the POF 4, in which the POF material was removed to the same extent. In the example shown the POF material was removed up to half of its diameter.

In order to create the POF pieces required for the manufacture of a coupler from the POF 4 processed in this manner, the processed POF 4, here called processed "long" POF, are now cut into short pieces. FIG. 4 indicates by arrows at which positions the processed long POF 4 must be cut. The cutting is purposefully carried out only after unwinding the processed long POF 4 from the mandrel 3 to create cutting surfaces that extend perpendicularly with respect to the axial direction of POF 4.

The length of the POF pieces produced depends on the distance of the sectors of large and small radii of the mandrel 3 and thus decisively on the diameter of the mandrel 3, which can be designed according to the desires of the user. In practice it has proven to be sufficient if a POF which has an active core of a diameter of 1 mm and is provided with a polyethylene sheath having an outer diameter of 2.2 mm, is turned-off according to a method of the invention on a length of approx. 10 mm to a semi-circular cross section. In the case of other fiber diameters, the length sections to be turned-off are to be adapted accordingly. For instance, a POF with an active core of a diameter of 3 mm should be turned-off to the semi-circular cross section on a length of approx. 50 mm.

It is self-evident that the cutting edge of the cutting chisel 6 has an effective width which is at least slightly larger than the axial displacement of the cutting chisel 6 along the mandrel per revolution of same. For obtaining a high surface quality of the sections of the POF processed by the cutting chisel 6, the cutting chisel is preferably made of diamond.

Before assembling the individual parts of the coupler it is favorable if, as already mentioned, the polished surfaces of the POFs are coated, e.g., in vacuum with a layer thickness of 10 nm of $SiO_2$, Ag, $SiO_2$, to improve crosstalk attenuation. Other types of coating are also possible, as already mentioned, preferably 100 nm HMDS as a support, then 100 nm Al or Ag as reflection layer, and again 100 nm HMDS as cover layer.

Figure 5:
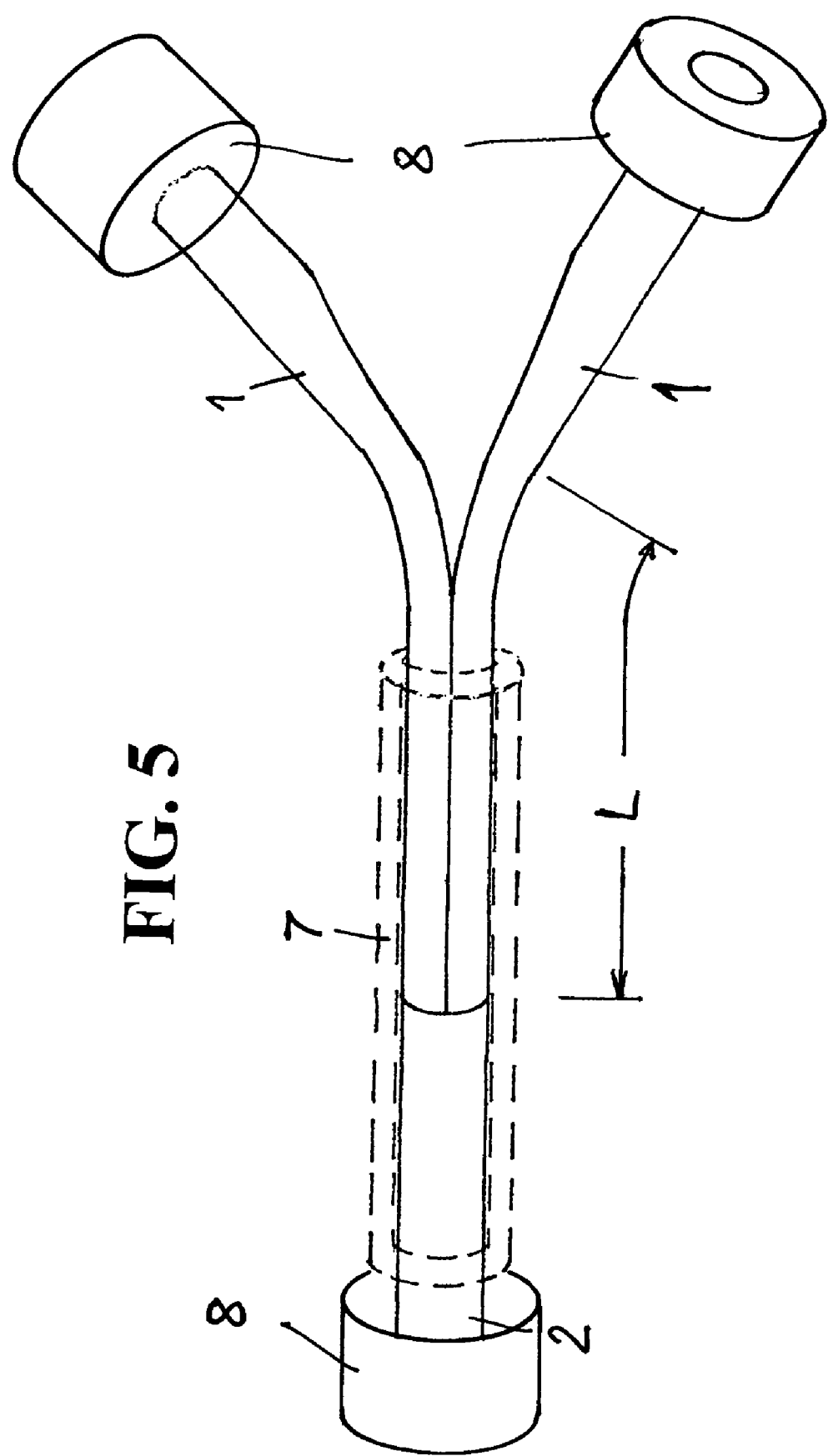
FIG. 5 shows two POFs turned-off regularly by half on a length section, said POFs being combined with a third POF in a sleeve to form a splitter.

FIG. 5 shows a coupler, which is manufactured from two POF pieces processed according to the invention and one third POF piece of a round cross section. The coupler according to FIG. 5 has two POF pieces 1 each consisting of a round optical fiber of a round cross section, which were turned-off on a length section L according to a method of the invention to half of their diameter and which thereby have a semi-circular cross section. The coupler further includes a third POF piece 2, which has a round cross section of the same diameter as the diameter in the non-processed area of the other POF pieces 1. The two processed POF pieces 1 are fully uncovered at least on a part of their processed length section L or are freed from their sheath 8 and are joined in parallel to one another and inserted from one side into a sleeve 7 that is shown in FIG. 5 in phantom lines. The third POF 2 is also uncovered at least in its end portion and inserted into the same sleeve 7 from its other side. The opposing end faces of the POF pieces 1 and 2 have been polished and abut one another. The POF pieces 1 and 2 may be clamped in the sleeve 7. It is also possible to adhere them together by use of a transparent adhesive and to adhere them into the sleeve 7. The end faces of the POF pieces 1 and 2 may also be adhered together by use of a transparent adhesive.

In the above description, reference is sometimes made to couplers, sometimes to splitters. The structure of the product is essentially not influenced thereby, the term splitter of coupler depends on the intended use.

While the principles of the invention have been shown and described in connection with specific embodiments, it is to be understood that such embodiments are by way of example and not limiting. Consequently, variations and modifications commensurate with the above teachings, and with the skill and knowledge of the relevant art, are within the scope of the present invention. The embodiments described herein are intended to illustrate best modes of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method of creating a flat surface on the circumference of at least one polymer optical fiber of round cross section by machining, in which the polymer optical fiber is wound onto a mandrel in several windings, the mandrel having an overall non-circular cross section with at least one radially-projecting sector in which a radius is constant or, starting from an apex, has a largest diameter linearly decreasing on both sides of the apex with increasing circumferential angular distance to said apex, the machining including turning-off the wound polymer optical fiber along the radially-projecting sector of the mandrel using a cutting chisel.

2. The method as claimed in claim 1 wherein the cutting chisel for turning-off the wound polymer optical fiber comprises a diamond cutting chisel.

3. The method as claimed in claim 1 wherein the turning-off of the wound polymer optical fiber turns-off the polymer optical fiber to a semi-circular cross section.

4. The method as claimed in claim 1 further comprising holding the polymer optical fiber under tensile stress during the turning process.

5. The method as claimed in claim 1 further comprising treating the turned-off faces with a layer sequence in vacuum, the sequence comprising one of Al and Ag, supported and also covered by one of $SiO_2$ and HMDS.

6. The method as claimed in claim 5 wherein the layers are applied at a thickness of 10 nm.

7. An apparatus for creating flat surfaces on the circumference of polymer optical fibers of round cross section by machining, comprising:

a lathe including a work piece holder in the form of a mandrel having a generally non-circular cross section with at least one projecting sector, in which a radius is constant or starting from an apex of a largest radius linearly decreases on opposite sides of the apex with increasing angular distance to the apex, the mandrel being adapted to accommodate a plurality of windings of a polymer optical fiber; and a cutting chisel which is adapted to be moved in parallel to a rotary axis of the mandrel and which has a distance from the rotary axis that is smaller than the largest radius of the mandrel enlarged by a diameter of the polymer optical fiber and larger than the largest radius of the mandrel.

8. The apparatus as claimed in claim 7 wherein the cutting chisel is a diamond cutting chisel.

9. The apparatus as claimed in claim 7 wherein the mandrel has a helically extending circumferential groove for accommodating the polymer optical fiber.

10. A polymer optical fiber for use in a splitter and having an end section of partially circular cross section delimited by a flat surface extending essentially in an axial direction, which said end section of partially circular cross section has a constant cross section at least in a length section staffing out from an end of the polymer optical fiber, in which the end section of partially circular cross section has a substantially rectangular flat surface, which is provided with a sequence of evaporated layers of one of Al and Ag, supported and also covered by one of $SiO_2$ and HMDS.

11. The polymer optical fiber as claimed in claim 10 wherein the layers have a thickness of approximately 100 nm.

* * * * *